(12) United States Patent
Zhu et al.

(10) Patent No.: US 9,898,381 B2
(45) Date of Patent: Feb. 20, 2018

(54) SIGNAL DETECTION CARD AND SIGNAL DETECTION SYSTEM

(71) Applicant: SHENZHEN AIRDRAWING TECHNOLOGY SERVICE CO., LTD., Shenzhen (CN)

(72) Inventors: Qing Zhu, Wuhan (CN); Zhi-Yong Zhao, Wuhan (CN); Tai-Chen Wang, New Taipei (TW)

(73) Assignee: Shenzhen Airdrawing Technology Service Co., Ltd, Shenzhen (CN)

( * ) Notice: Subject to any disclaimer, the term of this patent is extended or adjusted under 35 U.S.C. 154(b) by 348 days.

(21) Appl. No.: 14/788,462

(22) Filed: Jun. 30, 2015

(65) Prior Publication Data

US 2016/0364311 A1 Dec. 15, 2016

(30) Foreign Application Priority Data

Jun. 11, 2015 (CN) .......................... 2015 1 0318651

(51) Int. Cl.
*G06F 11/30* (2006.01)
*G06F 13/40* (2006.01)

(52) U.S. Cl.
CPC ...... *G06F 11/3031* (2013.01); *G06F 13/4081* (2013.01)

(58) Field of Classification Search
None
See application file for complete search history.

(56) References Cited

U.S. PATENT DOCUMENTS

| | | | |
|---|---|---|---|
| 5,568,610 A * | 10/1996 | Brown | G06F 13/4072 439/955 |
| 7,345,689 B2 * | 3/2008 | Janus | G06F 3/14 345/519 |
| 2014/0132835 A1 * | 5/2014 | Ma | H04N 5/222 348/465 |

* cited by examiner

*Primary Examiner* — Farley Abad
*Assistant Examiner* — Dayton Lewis-Taylor
(74) *Attorney, Agent, or Firm* — ScienBiziP, P.C.

(57) ABSTRACT

A signal detection system includes a motherboard and a signal detection card. The signal detection card includes a connecting plate, a first interface, and a detection module. The first interface is mounted in the connecting plate. The connecting plate includes a first signal detection terminal. The first interface is coupled to the first signal detection terminal of the connecting plate. The first interface is coupled to the motherboard to receive a signal from the motherboard. The detection module is configured to couple to the first signal detection terminal of the connecting plate and detect the signal via the first interface. A signal detection card is also provided.

18 Claims, 3 Drawing Sheets

SIGNAL DETECTION CARD AND SIGNAL DETECTION SYSTEM

FIELD

The subject matter herein generally relates to signal detection systems.

BACKGROUND

In designs of a motherboard, some detections need to be detected, such as a signal detection. In the signal detection, some values of a signal need to be detect, such as a current of the signal and a voltage of the signal. A signal detection system may be used to detect signals from motherboards.

BRIEF DESCRIPTION OF THE DRAWINGS

Implementations of the present technology will now be described, by way of example only, with reference to the attached figures.

DETAILED DESCRIPTION

Figure 1:
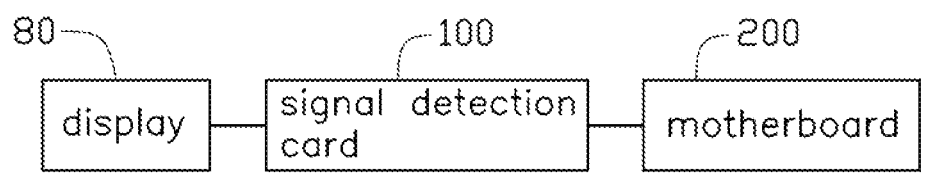
FIG. 1 is a block diagram of one embodiment of a signal detection system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present disclosure is described in relation to a signal detection system which detects signals from motherboards.

FIG. 1 illustrates an embodiment of a signal detection system. The signal detection system comprises a signal detection card 100 and a motherboard 200. The signal detection card 100 is configured to detect a signal from the motherboard 200. In at least one embodiment, each of the first interface 20 and the second interface 30 (shown in FIG. 2) is a hardware interface that allows the connection of external peripherals. In one example, each of the first interface 20 and the second interface 30 can be a THUNDERBOLT® interface.

Figure 2:
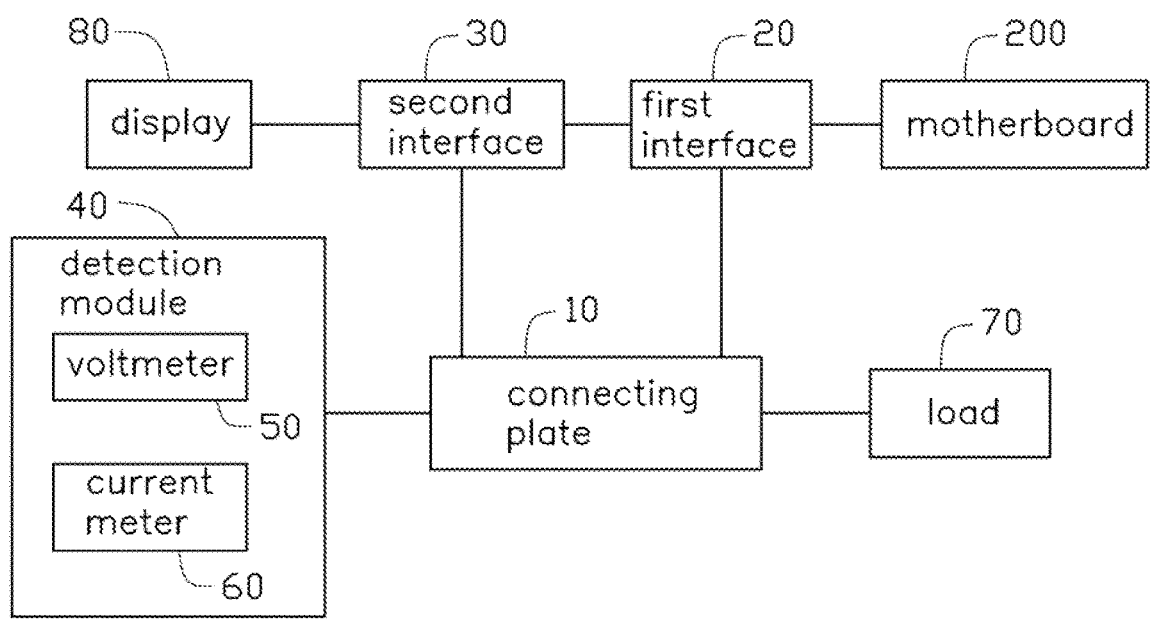
FIG. 2 is a block diagram of one embodiment of the signal detection system.

FIG. 2 illustrates that the signal detection card 100 comprises a connecting plate 10, a first interface 20, a second interface 30, and a detection module 40. The detection module 40 comprises a voltmeter 50 and a current meter 60. The first interface 20 and the second interface 30 are mounted on the connecting plate 10. The first interface 20 is coupled to the motherboard 200.

The signal detection card 100 further comprises a load 70. In at least one embodiment, the load 70 is a sliding rheostat.

The second interface 30 is configured to couple to a display 80.

Figure 3:
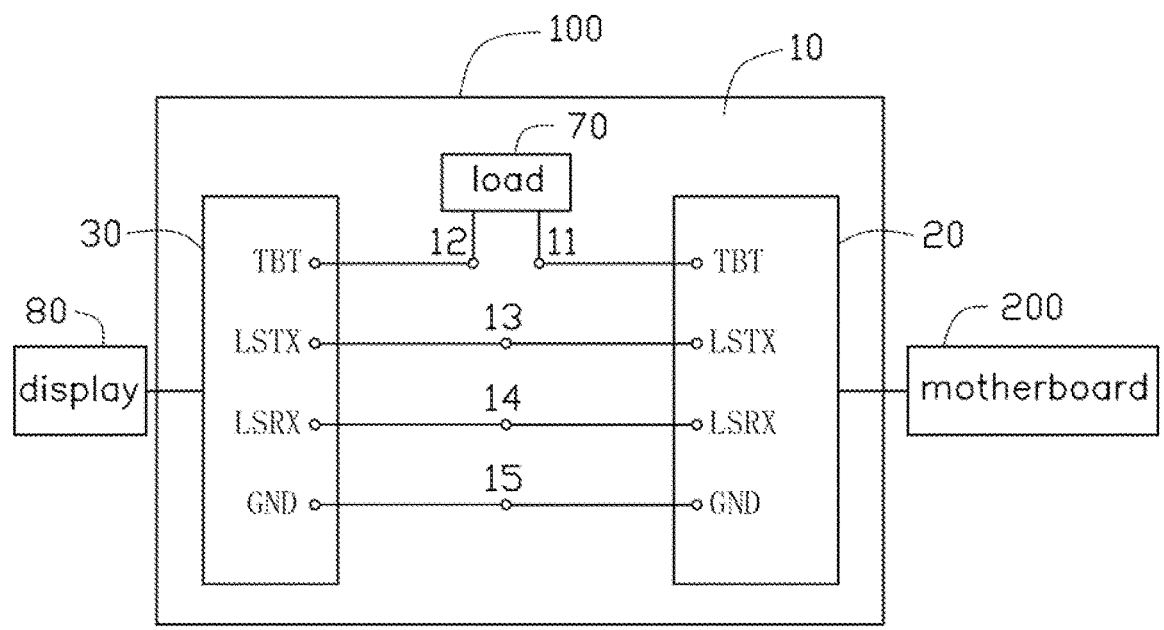
FIG. 3 is a circuit diagram of the signal detection system of FIG. 1.

FIG. 3 illustrates that the connecting plate 10 comprises a first signal detection terminal 11, a second signal detection terminal 12, a sending terminal 13, a receiving terminal 14, and a ground terminal 15.

The first interface 20 comprises a signal detection terminal TBT, a sending terminal LSTX, a receiving terminal LSRX, and a ground terminal GND.

The second interface 30 comprises a signal detection terminal TBT, a sending terminal LSTX, a receiving terminal LSRX, and a ground terminal GND.

The voltmeter 50 is configured to detect a voltage value of a signal from the motherboard 200. The current meter 60 is configured to detect a current value of the signal from the motherboard 200.

When in use, the first interface 20 is coupled to the motherboard 200. The load 70 is coupled between the first signal detection terminal 11 of the connecting plate 10 and the second signal detection terminal 12. The first signal detection terminal 11 of the connecting plate 10 is coupled to the signal detection terminal TBT of the first interface 20. The second signal detection terminal 12 of the connecting plate 10 is coupled to the signal detection terminal TBT of the second interface 30. The sending terminal 13 of the connecting plate 10 is coupled to the sending terminal LSTX of the first interface 20 and the sending terminal LSTX of the second interface 30. The receiving terminal 14 of the connecting plate 10 is coupled to the receiving terminal LSRX of the first interface 20 and the receiving terminal LSRX of the second interface 30. The ground terminal 15 of the connecting plate 10 is coupled to the ground terminal GND of the first interface 20 and the ground terminal GND of the second interface 30.

The motherboard 200 sends the signal to the first signal detection terminal 11 of the connecting plate 10 and the second signal detection terminal 12 of the connecting plate 10 via the signal detection terminal TBT of the first interface 20. Adjusting the load 70 can change the current value and the voltage value. The motherboard 200 sends data information to the display 80 via the sending terminal LSTX of the first interface 20, the receiving terminal LSRX of the first interface 20, the sending terminal LSTX of the second interface 30, and the receiving terminal LSRX of the second interface 30.

When a user needs to detect the voltage value, two connecting terminals of the voltmeter 50 are coupled to the first signal detection terminal 11 of the connecting plate 10 and the ground terminal 15 of the connecting plate 10, respectively. When the user needs to detect the current value, the two connecting terminals of the current meter 60 are coupled to the first signal detection terminal 11 of the connecting plate 10 and the second signal detection terminal 12 of the connecting plate 10, respectively.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. A signal detection system comprising:
    a motherboard; and
    a signal detection card coupled to the motherboard having:
        a connecting plate comprising a first signal detection terminal,
        a first interface mounted on the connecting plate coupled to the first signal detection terminal of the connecting plate and to the motherboard to receive a signal from the motherboard, and
        a detection module configured to couple to the first signal detection terminal of the connecting plate and detect the signal via the interface;
        wherein the connecting plate further comprises a second signal detection terminal, a sliding rheostat is coupled between the first signal detection terminal and the second signal detection terminal of the connecting plate.

2. The signal detection system of claim 1, wherein the first interface is a THUNDERBOLT interface.

3. The signal detection system of claim 1, wherein the signal detection card further comprises a second interface, the second interface is mounted on the connecting plate, and the second interface is configured to couple a display.

4. The signal detection system of claim 3, wherein the second interface is a THUNDERBOLT interface.

5. The signal detection system of claim 4, wherein the connecting plate comprises a sending terminal, the sending terminal of the connecting plate is coupled to a sending terminal of the first interface and a sending terminal of the second interface.

6. The signal detection system of claim 5, wherein the connecting plate further comprises a receiving terminal, the receiving terminal of the connecting plate is coupled to a receiving terminal of the first interface and a receiving terminal of the second interface, and the signal detection card is configured to send data information to the display from the motherboard via the sending terminal, the receiving terminal of the connecting plate, the sending terminal of the first interface, the receiving terminal of the first interface, the sending terminal of the second interface, and the receiving terminal of the second interface.

7. The signal detection system of claim 1, wherein the first interface comprises a signal detection terminal, the first signal detection terminal of the connecting plate is coupled to the signal detection terminal of the first interface to receive the signal from the motherboard.

8. The signal detection system of claim 1, wherein the detection module comprises a current meter, the current meter is configured to detect a current value of the signal, and the current meter is configured to be coupled between the first signal detection terminal and the second signal detection terminal of the connecting plate.

9. The signal detection system of claim 1, wherein the detection module comprises a voltmeter and a current meter, the voltmeter is configured to detect a voltage value of the signal, and the current meter is configured to detect a current value of the signal.

10. A signal detection system comprising:
    a motherboard; and
    a signal detection card having:
        a connecting plate comprising a first signal detection terminal,
        a first interface comprising a signal detection terminal, and
        a detection module;
        wherein the first interface is mounted on the connecting plate;
        wherein the signal detection terminal of the first interface is coupled to the first signal detection terminal of the connecting plate;
        wherein the signal detection terminal of the first interface is coupled to the motherboard to receive a signal from the motherboard;
        wherein the detection module is configured to couple to the first signal detection terminal of the connecting plate and detect the signal via the first interface; and
        wherein the connecting plate further comprises a second signal detection terminal, a sliding rheostat is coupled between the first detection terminal and the second signal detection terminal of the connecting plate.

11. The signal detection system of claim 10, wherein the first interface is a THUNDERBOLT interface.

12. The signal detection system of claim 10, wherein the signal detection card further comprises a second interface, the second interface is mounted on the connecting plate, and the second interface is configured to couple a display.

13. The signal detection system of claim 12, wherein the second interface is a THUNDERBOLT interface.

14. The signal detection system of claim 13, wherein the connecting plate comprises a sending terminal, the sending terminal of the connecting plate is coupled to a sending terminal of the first interface and a sending terminal of the second interface.

15. The signal detection system of claim 14, wherein the connecting plate further comprises a receiving terminal, the receiving terminal of the connecting plate is coupled to a receiving terminal of the first interface and a receiving terminal of the second interface, and the signal detection card is configured to send data information to the display from the motherboard via the sending terminal, the receiving terminal of the connecting plate, the sending terminal of the first interface, the receiving terminal of the first interface, the sending terminal of the second interface, and the receiving terminal of the second interface.

16. The signal detection system of claim 10, wherein the detection module comprises a voltmeter and a current meter, the voltmeter is configured to detect a voltage value of the signal, the current meter is configured to detect a current value of the signal, the current meter is configured to be coupled between the first signal detection terminal and the second signal detection terminal of the connecting plate, and the voltmeter is configured to be coupled between the first signal detection terminal and a ground terminal of the connecting plate.

17. A signal detection card comprising:
    a connecting plate having a first signal detection terminal;
    a first interface mounted on the connecting plate and coupled to the first signal detection terminal of the connecting plate; and
    a detection module;

wherein the first interface is coupled to the first signal detection terminal of the connecting plate;

wherein the first interface is coupled to the motherboard to receive a signal from the motherboard;

wherein the detection module is configured to couple to the first signal detection terminal of the connecting plate and detect the signal via the first interface; and wherein the connecting plate further comprises a second signal detection terminal, a sliding rheostat is coupled between the first signal detection terminal and the second signal detection terminal of the connecting plate.

18. The signal detection card of claim 17, further comprising a second interface mounted on the connecting plate, wherein the second interface is configured to couple to a display, the first interface is configured to receive data information from the motherboard, and the second interface is configured to send the data information to the display.

* * * * *